(12) United States Patent
Ito et al.

(10) Patent No.: US 10,646,946 B2
(45) Date of Patent: May 12, 2020

(54) WELD OVERLAY SYSTEM

(71) Applicant: KAWASAKI JUKOGYO KABUSHIKI KAISHA, Kobe-shi, Hyogo (JP)

(72) Inventors: Chiaki Ito, Miki (JP); Masahiko Akamatsu, Himeji (JP); Shingo Yonemoto, Kakogawa (JP); Takanori Kozuki, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 287 days.

(21) Appl. No.: 15/539,827

(22) PCT Filed: Dec. 26, 2014

(86) PCT No.: PCT/JP2014/006506
§ 371 (c)(1),
(2) Date: Jun. 26, 2017

(87) PCT Pub. No.: WO2016/103306
PCT Pub. Date: Jun. 30, 2016

(65) Prior Publication Data
US 2017/0355033 A1    Dec. 14, 2017

(51) Int. Cl.
*B23K 9/04* (2006.01)
*B23K 37/02* (2006.01)
*B23K 101/06* (2006.01)

(52) U.S. Cl.
CPC .......... *B23K 9/048* (2013.01); *B23K 37/0229* (2013.01); *B23K 2101/06* (2018.08)

(58) Field of Classification Search
CPC . B23K 9/048; B23K 37/0229; B23K 2101/06
(Continued)

(56) References Cited

U.S. PATENT DOCUMENTS 2,841,687 A    7/1958  Richter
6,781,083 B1 *  8/2004  Keller .................... B23K 9/048
                                                    219/76.15
(Continued)

FOREIGN PATENT DOCUMENTS

JP    S50-10750 A    2/1975
JP    S58-68470 A    4/1983
(Continued)

OTHER PUBLICATIONS

Mar. 24, 2015 International Search Report issued in International Patent Application No. PCT/JP2014/006506.
(Continued)

*Primary Examiner* — Tu B Hoang
*Assistant Examiner* — Diallo I Duniver
(74) *Attorney, Agent, or Firm* — Oliff PLC

(57) ABSTRACT

A weld overlay system includes a rotation drive section which rotates a tube around its axis; and a welding unit which applies a weld material to the outer peripheral surface of the rotating tube, while the welding unit is advanced along an axial direction of the tube, the welding unit includes: a welding torch; and a weld material supply section which supplies the weld material, the welding torch is disposed such that a tip end of the welding torch is located at an angular position that is advanced at a predetermined angle in a direction opposite to a rotational direction of the tube, and the welding torch is inclined at a predetermined angle in the rotational direction of the tube with respect to a reference line passing through a center axis of the tube and the tip end of the welding torch, viewed from the axial direction of the tube.

4 Claims, 2 Drawing Sheets

(58) Field of Classification Search
USPC .................................................. 219/76.15
See application file for complete search history.

(56) References Cited

U.S. PATENT DOCUMENTS 6,858,813 B1 * 2/2005 Keller .................... B23K 9/048
219/130.51
2013/0299463 A1 11/2013 Kanemaru et al.

FOREIGN PATENT DOCUMENTS

| JP | 2013-158792 A | 8/2013 |
| KR | 2013-0103495 A | 9/2013 |

OTHER PUBLICATIONS

Jun. 27, 2017 International Preliminary Report on Patentability issued in International Patent Application No. PCT/JP2014/006506.

* cited by examiner

WELD OVERLAY SYSTEM

TECHNICAL FIELD

The present invention relates to a weld overlay system.

BACKGROUND ART

Patent Literature 1 described below discloses a weld overlay (overlay welding, build-up welding) system which weld overlays the outer peripheral surface of a linear tube with a circular cross-section while rotating the tube. For example, in a case where a weld overlay material with a high corrosion resistance is applied to the outer peripheral surface of the tube with the circular cross-section, the corrosion resistance of the outer peripheral surface of the tube can be improved.

CITATION LIST

Patent Literature

Patent Literature 1: US Patent Publication No. 6781083 Specification

SUMMARY OF INVENTION

Technical Problem

In a case where the weld overlay material is applied to the outer peripheral surface of the tube with the circular cross-section, a spiral weld bead (weld bead with a spiral shape) is formed on the outer peripheral surface of the tube and a groove is formed between adjacent weld bead portions of the weld bead. If a distance from the bottom of the groove to the top of the weld bead (hereinafter this distance will be referred to as the "depth of the groove") is large, then a crack may be generated from the groove by bending, and the tube may be broken.

In view of the above-described circumstances, the present invention has been made. An object of the present invention is to provide a weld overlay system which can reduce the depth of the groove of the weld bead, and secure a good weld overlay quality.

Solution to Problem

According to an aspect of the present invention, a weld overlay system which weld overlays an outer peripheral surface of a tube with a circular cross-section, comprises a rotation drive section which rotates the tube around an axis of the tube; and a welding unit which applies a weld material to the outer peripheral surface of the tube which is rotating, while the welding unit is advanced along an axial direction of the tube, wherein the welding unit includes: a welding torch which generates an arc in a region between the welding torch and the outer peripheral surface of the tube; and a weld material supply section which supplies the weld material to a region to be welded, wherein the welding torch is disposed in such a manner that a tip end of the welding torch is located at an angular position that is advanced at a predetermined angle in a direction opposite to a rotational direction of the tube, with respect to a top portion of the tube, and wherein the welding torch is inclined at a predetermined angle in the rotational direction of the tube with respect to a reference line passing through a center axis of the tube and the tip end of the welding torch, when viewed from the axial direction of the tube.

In accordance with this configuration, a weld pool (pool or puddle of molten metal, including molten base metal of the tube and molten weld material) is formed in a region which is advanced in the direction opposite to the rotational direction of the tube, with respect to the top portion of the tube. For this reason, the weld pool tends to spread in the circumferential direction of the tube by a gravitational force. As a result, the weld bead formed on the outer peripheral surface becomes gentle, and the depth of the groove of the weld bead can be reduced. In addition, since the weld pool which is a region to which the weld material is supplied spreads, welding work can be stably performed. Further, since the welding torch is inclined in the rotational direction of the tube with respect to the reference line, a large amount of arc can be generated in a region on a side where the weld pool spreads by the gravitational force. In this way, the spread of the weld pool can be facilitated.

In the above-described weld overlay system, the weld material supply section may be configured to supply the weld material along a direction which is inclined at a predetermined angle in the rotational direction of the tube with respect to the welding torch, when viewed from the axial direction of the tube. In accordance with this configuration, since the weld pool is advanced with respect to the welding torch, and direct effects of arc heat on the base metal can be avoided, low dilution can be obtained.

In the above-described weld overlay system, the welding torch may be inclined at a predetermined angle in a direction in which the welding unit is retracted, with respect to a reference plane perpendicular to the center axis of the tube. In accordance with this configuration, since the weld pool spreads rearward in the axial direction, with respect to the welding torch, the depth of the groove of the weld bead can be reduced.

In the above-described weld overlay system, the welding torch may be inclined at a predetermined angle in a direction in which the welding unit is advanced, with respect to a reference plane perpendicular to the center axis of the tube. In accordance with this configuration, since the arc generated from the welding torch extends in the axial direction of the tube, the weld pool easily spreads in the axial direction of the tube. As a result, the weld bead becomes gentle, and the depth of the groove of the bead can be reduced.

Advantageous Effects of Invention

In accordance with the above-described weld overlay system, the depth of the groove of the weld bead can be reduced, and a good weld overlay quality can be secured.

DESCRIPTION OF EMBODIMENTS

Hereinafter, the embodiment of the present invention will be described with reference to the drawings. Throughout the drawings, the same or corresponding constituents are designated by the same reference symbols and will not be described in repetition.

Schematic Configuration of Weld Overlay System

First of all, the schematic configuration of a weld overlay system 100 will be described. The weld overlay system 100 is an apparatus which weld overlays the outer peripheral surface of a linear (straight-line) tube 101 with a circular cross-section. In the present embodiment, the material (base metal) of the tube 101 is iron. The material of the tube 101 is not limited to this.

Figure 1:
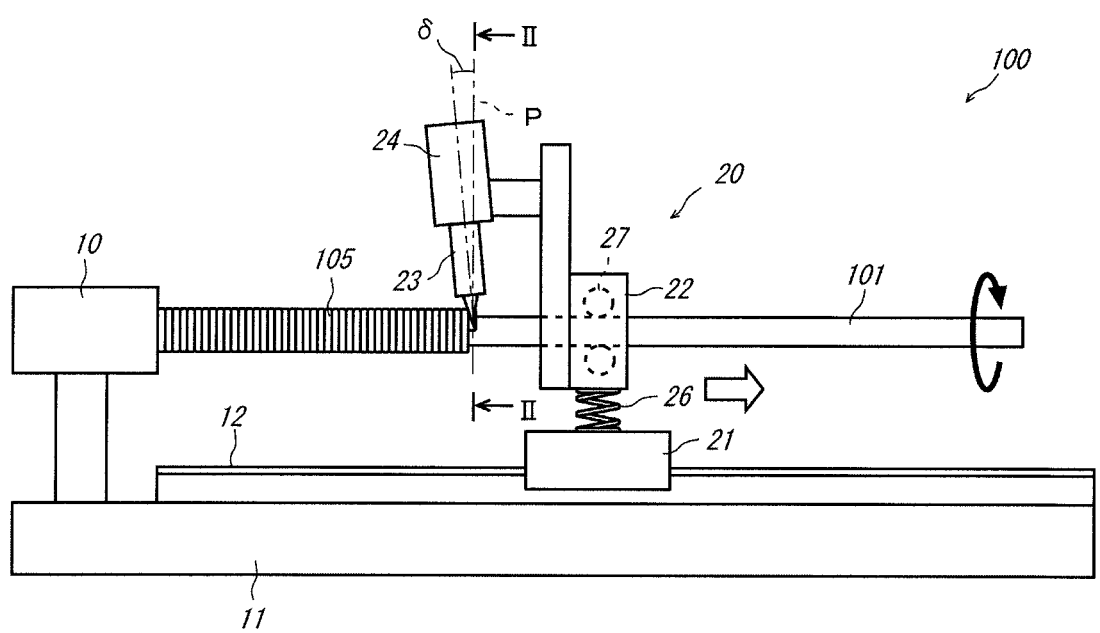
FIG. 1 is a schematic view showing the configuration of a weld overlay system.
Figure 2:
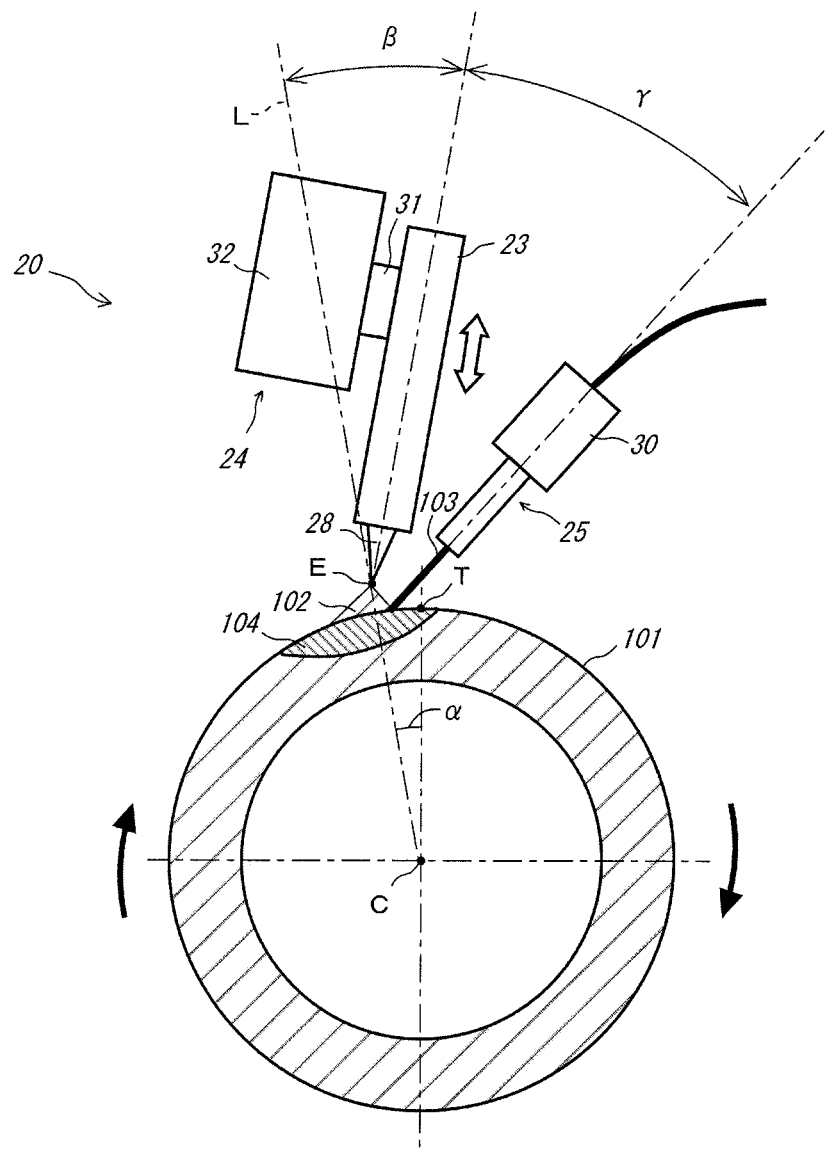
FIG. 2 is a schematic view taken in the direction of arrows along line II-II of FIG. 1.

As shown in FIGS. 1 and 2, the weld overlay system 100 includes a rotation drive section 10 and a welding unit 20. The welding unit 20 includes a carriage 21, a copying section 22, a welding torch 23, and an arc voltage control (AVC) unit 24, and a weld material supply section 25. Hereinafter, these constituents will be sequentially described.

The rotation drive section 10 is configured to retain one end portion of the tube 101 and rotate the retained tube 101 around the axis of the tube 101 (in a clockwise direction in FIG. 2). The rotation drive section 10 is fixed to a base 11 of the weld overlay system 100. During a weld overlay process, the rotation drive section 10 rotates the tube 101 at, for example, about 5 rpm, although the rotational speed of the tube 101 is varied depending on conditions of construction.

The carriage 21 advances the whole of the welding unit 20 along the axial direction of the tube 101 (hereinafter this direction will be simply referred to as "axial direction"). In the example of FIG. 1, the carriage 21 travels to the right in FIG. 1 during the weld overlay process. The base 11 of the weld overlay system 100 is provided with a rail 12 extending along the axial direction. The carriage 21 travels along the rail 12.

The copying section 22 is displaceably supported on the carriage 21 with an elastic member 26 interposed between the copying section 22 and the carriage 21. The copying section 22 is in contact with the outer peripheral surface of the tube 101 with rollers 27 interposed between the copying section 22 and the tube 101. In this configuration, even in a case where the tube 101 is distorted due to heat generated in the weld overlay process, the copying section 22 can move in the axial direction while copying (following) the distortion of the tube 101.

The welding torch 23 is a TIG welding torch which generates an arc 102 in a region between a tungsten electrode 28 attached on the tip end of the welding torch 23 and the outer peripheral surface of the tube 101. Alternatively, the welding torch 23 may be a plasma arc welding torch. A weld pool 104 formed by the arc 102 is shielded by an argon gas injected from a location which is in the vicinity of the tungsten electrode 28, or a shielding gas which is a mixture gas containing the argon gas and another gas.

The AVC unit 24 includes a torch bracket 31 on which the welding torch 23 is attached, a drive mechanism 32 which includes a ball screw (not shown) and a drive motor (not shown) and linearly moves the torch bracket 31, and a controller (not shown) which controls the operation of the drive mechanism. The controller detects a voltage (weld voltage) between the welding torch 23 and the tube 101 during the weld overlay process, and controls the operation of the drive motor of the drive mechanism 32 so that a distance between the tip end of the tungsten electrode 28 and the tube 101 is maintained at a constant value based on the detected weld voltage.

The weld material supply section 25 supplies a weld material 103 to a region to be welded. Although in the present embodiment, the weld material 103 is formed in a wire shape, the weld material 103 may be powdered. The weld material supply section 25 includes a heating section 30 which pre-heats the weld material 103 to accelerate melting of the weld material 103. Although in the present embodiment, Alloy625 with a high corrosion resistance is used as the weld material 103, the weld material 103 is not limited to this.

The schematic configuration of the weld overlay system 100 has been described above. In the weld overlay system 100, the tube 101 is weld overlaid in such a way that the welding unit 20 is advanced in the axial direction while the rotation drive section 10 is rotating the tube 101. In this way, a spiral weld bead (weld bead with a spiral shape) 105 is formed on the outer surface of the tube 101.

Position of Welding Torch

Next, the position of the welding torch 23 will be described. As shown in FIG. 2, the welding torch 23 is disposed in such a manner that its tip end E is located at an angular position that is advanced at a predetermined angle α in a direction (in a counterclockwise direction in FIG. 2) opposite to the rotational direction of the tube 101, with respect to a top portion T of the tube 101.

Since the welding torch 23 is disposed in the above-described manner, the weld pool 104 is formed in a region of the tube 101 which is advanced in the direction opposite to the rotational direction, with respect to the top portion T of the tube 101. For this reason, the weld pool 104 tends to spread in a downward direction by a gravitational force. As a result, the weld bead 105 becomes gentle, and the depth of the groove of the weld bead 105 can be reduced. In addition, since the weld pool 104 which is the region to which the weld material 103 is supplied spreads, the weld material 103 can be stably supplied. Further, since the weld pool 104 is applied with a force in the same direction all the time by the gravitational force, and the shape of the weld pool 104 is stabilized, this is preferable for stable supply of the weld material 103.

Inclination Angle (1) of Welding Torch

Next, the inclination angle of the welding torch 23 will be described. As shown in FIG. 2, the welding torch 23 is inclined at a predetermined angle β in the rotational direction (in the clockwise direction in FIG. 2) of the tube 101 with respect to a reference line L passing through a center axis C of the tube 101 and the tip end E of the welding torch 23, when viewed from the axial direction of the tube 101. Since the welding torch 23 is inclined in this way, the weld pool 104 can more easily spread. As a result, the depth of the groove can be further reduced, and welding work can be more stably performed.

Supply Angle of Weld Material

Next, supply angle of the weld material 103 (angle at which the weld material 103 is supplied) will be described. As shown in FIG. 2, the weld material supply section 25 is configured to supply the weld material 103 along a direction which is inclined at a predetermined angle γ in the rotational direction of the tube 101 with respect to the welding torch 23, when viewed from the axial direction of the tube 101. Because of this configuration, the weld material 103 absorbs a part of heat energy of the arc while the weld material 103 supplied at a high speed from a location in the rotational direction of the tube 101 relative to the welding torch 23 is molten. Therefore, low dilution and high construction stability can be achieved.

Inclination Angle (2) of Welding Torch

Next, the inclination angle of the welding torch 23 in conjunction with the axial direction of the tube 101 will be described. As shown in FIG. 1, the welding torch 23 is inclined at a predetermined angle δ in a direction in which the welding unit 20 is retracted (retreated), with respect to a reference plane P perpendicular to the center axis C of the tube 101. Since the welding torch 23 is inclined in this way, the weld pool 103 is advanced with respect to the welding torch 23, and direct effects of arc heat on the base metal can be avoided. As a result, low dilution can be obtained. Alternatively, the welding torch 23 may be inclined in a direction in which the welding unit 20 is advanced, with respect to the reference plane P perpendicular to the center axis C of the tube 101. In this case, the weld pool 104 spreads rearward in the axial direction, with respect to the welding torch 23. Therefore, the depth of the groove of the weld bead 105 can be reduced.

REFERENCE SIGNS LIST

10 rotation drive section
20 welding unit
23 welding torch
25 welding material supply section
100 weld overlay system
101 tube with circular cross-section
102 arc
103 weld material
P reference plane
L reference line

The invention claimed is:

1. A weld overlay system which weld overlays an outer peripheral surface of a tube with a circular cross-section, the weld overlay system comprising:
   a rotation drive section which rotates the tube around an axis of the tube; and
   a carriage configured to travel along a rail, the carriage supporting (i) rollers configured to engage with the tube; (ii) an elastic member arranged between the rollers and the carriage; and (iii) a welding unit that is configured to apply a weld material to the outer peripheral surface of the tube which is rotating, while the welding unit is advanced along an axial direction of the tube,
wherein the welding unit includes:
a welding torch which generates an arc in a region between the welding torch and the outer peripheral surface of the tube; and
a weld material supply section which supplies the weld material to a region to be welded,
wherein the welding torch is configured to be disposed in such a manner that a tip end of the welding torch is located at an angular position that is advanced at a predetermined angle in a direction opposite to a rotational direction of the tube, with respect to a top portion of the tube,
wherein an opposite end of the welding torch opposite to the tip end is disposed on a rotation-direction side of the tube with respect to the top portion of the tube, and
wherein a virtual line extending from the tip end of the welding torch through the opposite end of the welding torch is inclined at a predetermined angle in the rotational direction of the tube with respect to a reference line passing through a center axis of the tube and the tip end of the welding torch, when viewed from the axial direction of the tube.

2. The weld overlay system according to claim 1, wherein the weld material supply section is configured to supply the weld material along a direction which is inclined at a predetermined angle in the rotational direction of the tube with respect to the welding torch, when viewed from the axial direction of the tube.

3. The weld overlay system according to claim 1, wherein the welding torch is inclined at a predetermined angle in a direction in which the welding unit is retracted, with respect to a reference plane perpendicular to the center axis of the tube.

4. The weld overlay system according to claim 1, wherein the welding torch is inclined at a predetermined angle in a direction in which the welding unit is advanced, with respect to a reference plane perpendicular to the center axis of the tube.

* * * * *